United States Patent [19]

Fathauer

[11] 3,739,367

[45] June 12, 1973

[54] SLOW ROTATIONAL SPEED ALARM

[75] Inventor: George H. Fathauer, Decatur, Ill.

[73] Assignee: Dickey-john Corporation, Chatham, Ill.

[22] Filed: Aug. 19, 1971

[21] Appl. No.: 173,138

[52] U.S. Cl.............. 340/271, 340/248 P, 340/263, 340/267 R
[51] Int. Cl. ............................................ G08b 21/00
[58] Field of Search ............. 340/271, 263, 248 P, 340/259

[56] References Cited
UNITED STATES PATENTS

| | | | |
|---|---|---|---|
| 3,611,343 | 10/1971 | Schoenbach | 340/271 |
| 3,370,286 | 2/1968 | Buss | 340/263 |
| 3,583,405 | 6/1971 | Gerhardt | 340/271 |
| 2,984,789 | 5/1961 | O'Brien | 340/248 P |
| 2,996,630 | 8/1961 | Bensema et al. | 340/248 P X |
| 3,146,432 | 8/1964 | Johnson | 340/271 X |
| 3,500,375 | 3/1970 | Klimo | 340/271 X |

Primary Examiner—David L. Trafton
Attorney—Roy H. Olson, Richard R. Trexler and Richard Bushnell et al.

[57] ABSTRACT

A digital alarm that produces a signal when a function that is being monitored falls below a preset alarm point. The monitored function may be the speed of a shaft. Input pulses representing the function to be monitored are fed into the device and the period of the input pulses are compared with the interval of a signal generated by a monostable multivibrator within the device. If the input signal period is greater than the multivibrator interval, the alarm sounds, but if the input signal period is less than the multivibrator interval the alarm is off. When the alarm is driven either off or on, it is held there until the monitored function changes to the complement condition.

10 Claims, 4 Drawing Figures

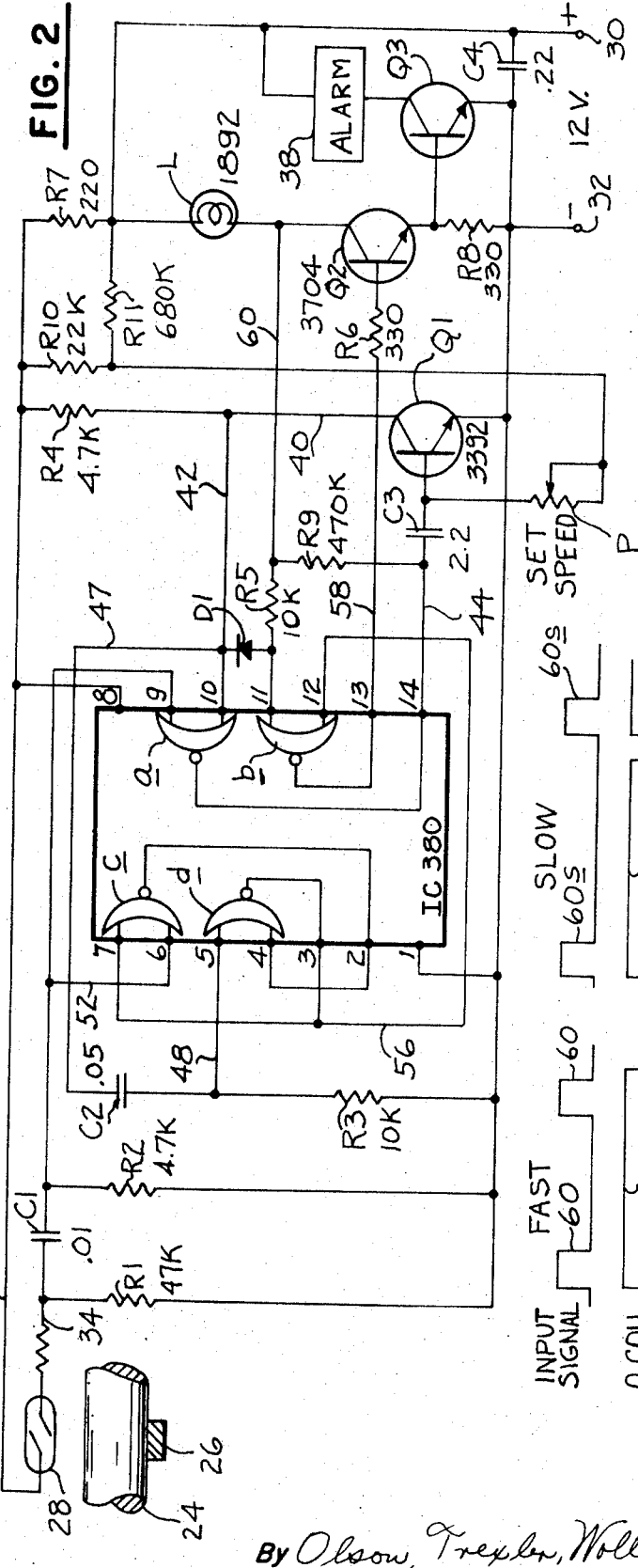

SLOW ROTATIONAL SPEED ALARM

BACKGROUND OF THE INVENTION

This invention relates to alarms for indicating that a function, such as the speed of a rotating shaft, is less than a preselected amount. In many types of machines, apparatus and systems, it is necessary or desirable to monitor a condition or function and to provide for an alarm that produces a signal when the condition or function departs from a preselected value. For example, in some machines it is desirable to monitor the speed of rotation of a shaft and to sound an alarm when the speed of the shaft drops below a preselected amount. In agricultural equipment such as combines, planters, and the like, the monitoring and alarm-signalling of a slowdown of the speed of a shaft is important so that potential trouble can be detected early and the situation remedied before more serious difficulties or possible breakdown occurs. This is of particular importance in a combine which has a number of functions or sub-assemblies each of which may have a critical shaft that should be monitored so that a slowdown condition may be promptly detected.

OBJECTS AND SUMMARY OF THE INVENTION

It is an object of the present invention to provide an alarm for indicating that the magnitude of a function has dropped below a predetermined level. The alarm embodies circuitry that is particularly suitable for monitoring the speed of rotation of a shaft, although the alarm may be used to monitor other functions (e.g. pressure, voltage, temperature etc.) which may be converted to digital form for compatibility with the circuit of the invention.

A further object of this invention is to provide a digital alarm which has a rapid response and is, therefore, capable of rapid detection and alarm-signalling when the function to be monitored has an output below the predetermined or preset output.

In accordance with one form of the invention, a machine, such as a combine, has a shaft, the speed of which is to be monitored. A sensing device generates input pulses at a frequency proportional to the speed of the shaft. The circuitry of the alarm generates a reference signal of predetermined duration relative to a preselected speed for the shaft. The circuitry provides for an arrangement that compares the interval of the input pulses with the interval of the reference signal to determine if the speed of the shaft is faster or slower than a preselected amount. If the slow condition exists, an alarm will be actuated whereas if a fast condition exists the signalling device will be in its off or non-signalling condition. The signalling device may be a lamp, buzzer, a combination of the two, or other suitable components. Normally, if a lamp is used, the slow condition is represented by a turn-on of the lamp; however, the slow condition could be signalled by a turn-off of the lamp and with the lamp being normally on in the fast condition. Moreover, where the alarm is used in a combine, a sensor may be mounted adjacent to the shaft and the output of the sensor sent via a cable to a console in the cab of the combine for view by the operator. The sensor may be a reed switch that is opened and closed by a magnet on the shaft whereby a series of pulses are generated proportional to the speed of the shaft. Moreover, a single alarm circuit of the type herein described may be used to monitor different shafts of the combine. In such case, each shaft has its own sensor, and the console may embody separate speed-set controls for each shaft. Each speed set control and sensor may be selectively switched into the alarm circuitry, as desired, depending upon which shaft the operator desires to monitor.

BRIEF DESCRIPTION OF THE FIGURES

In the drawing:

FIG. 1 is a side elevational view, somewhat diagrammatic in form, of a combine that utilizes an alarm constructed in accordance with the present invention;

FIG. 2 is a circuit diagram of the alarm; and

FIGS. 3 and 4 are wave forms showing the signals in the fast and slow conditions at certain points in the circuitry of FIG. 2.

Referring now in more detail to the drawing, FIG. 1 shows a combine 20 having the usual known functions or sub-assemblies that perform the various operations of the combine. These are known and will not be described in detail. Suffice it to say, however, for the present invention the combine has a conventional cylinder 22 with a cylinder shaft 24. By way of example, the present invention will be described with reference to monitoring the speed of the cylinder shaft 24 although, as heretofore pointed out, the invention may be applied to monitoring the speed of any other shaft of the combine, or the shafts of other machines, or to monitor various analog functions of other devices or systems.

Referring now to FIG. 2, the shaft 24 is shown diagrammatically to include a magnet 26 for actuating a reed switch 28 that constitutes a pulse generator operated by the shaft 24. The reed switch 28 is connected across power supply terminals 30, 32 through resistance R1 so that upon closure of the reed switch 28, an input pulse will appear on conductors 34, 36. The terminals 30, 32 may be tapped from the battery of the combine. One magnet 26 is illustrated, which would mean that the reed switch 28 would close once during each revolution of the shaft 24. However, more than one magnet 26 may be used and with the magnets being equally spaced arcuately about the circumference of the shaft 24. In any event, the magnet or magnets 26 in cooperation with the reed switch 28 provides for a generation of input pulses proportional to the speed of rotation of the shaft 24. Obviously, other forms of pulse generators may be used. The conductors 34, 36 may be cabled together and extend from the reed switch to the cab of the combine where the remaining circuitry, to be hereinafter described, may be housed in a console or in any other suitable manner.

The circuit shown in FIG. 2 comprises resistors R1 through R11 inclusive, capacitors C1 through C4 inclusive, transistors Q1 through Q3 inclusive, diode D1, set speed potentiometer P, and the integrated circuit (type 380) having terminals numbered 1 through 14 inclusive. These terminals correspond to the standard numbering of the terminals for this integrated circuit. Furthermore, as will be seen from the logic diagram within the integrated circuit, the latter is a quad 2-input NOR gate circuit made up of the four NOR gates $a$, $b$, $c$, $d$. The values of the resistors are shown in ohms or thousands of ohms, as the case may be, and the values of the capacitors are indicated in microfarads. The types of transistors for Q1 and Q2 are shown; the type of transistor for Q3 will depend upon the nature of the alarm 38. The low speed lamp L may be a type 1892 lamp.

With the parameters indicated, resistor R4 provides a load resistance for the collector of transistor Q1 while resistor R7 is a dropping resistor so that the power supply terminal 8 of the integrated circuit is at the proper voltage. Resistor R8 serves as a current limiter to the base of transistor Q3 when the latter is turned on, and capacitor C4 is a power-supply filter capacitor. The resistance networks R10, R11 provide a divided down d.c. voltage to the set speed potentiometer P to make the setting of the latter independent of fluctuations of power supply voltage. The purpose of the potentiometer P will be hereinafter more fully described. Resistor R6 serves as an input resistor to the base of transistor Q2 while R5 is used to provide an impedance so that diode D1 can function.

The NOR gate a and the transistor Q1 cooperate to provide a monostable multivibrator that is triggered by an input signal through capacitor C1 when the reed switch 28 closes. The time interval of the multivibrator is determined by the setting of the set speed potentiometer P and is used as a reference signal. For this purpose the potentiometer P may be suitably calibrated in rpm if the function being monitored is a rotating shaft. Transistor Q1 is normally on as a result of the bias on its base from the set speed potentiometer P. The collector of Q1 is at a state 0 when Q1 is on, and this zero input appears at terminal 10, which is one input of the NOR gate a. Before a signal is received from the input through capacitor C1 to terminal 9, the other input (terminal 10) of NOR gate a, is also at state 0. Consequently, the output of the NOR gate a at terminal 14 is at state 1. When a pulse arrives through capacitor C1 to terminal 9 causing the signal at terminal 9 to go to state 1, the output of NOR gate a at terminal 14 goes to state 0. Consequently, the voltage at the base of collector Q1 drops shutting off Q1. The collector of Q1 now rises to state 1, and this signal is applied over conductors 40, 42 to input terminal 10 of NOR gate a. Consequently, the output of NOR gate a at terminal 14 and conductor 44 is held at a state 0. The voltage across the base of transistor Q1 rises as determined by the time constant of potentiometer P and capacitor C3 to hold the multivibrator on for its preset time. The wave forms on the collector of Q1 and hence on conductors 40, 42 is shown at 46 in FIGS. 3 and 4.

The signal on the collector of transistor Q1 is also sent over conductor 47 and through capacitor C2 to conductor 48 and terminal 5, which is an input to NOR gate d. The wave form of the signal on conductor 48 is shown at 50 in FIGS. 3 and 4 and is the Q1 collector signal differentiated in accordance with the values of capacitor C2 and resistor R3. The signal input through capacitor C1 is also sent over conductor 52 to terminal 6 which is an input terminal of NOR gate c. The wave form of this input signal to terminal 6 is shown at 54 in FIGS. 3 and 4 and is a differentiated input signal as determined by the values of capacitor C1 and resistor R2. For reasons hereinafter more fully explained, the signal shown at 50 is differentiated with a longer time constant than is the signal shown at 54 with the result that the signal or pulse 50 is of longer duration than that of the pulse or signal 54. The NOR gates c, d form a flip-flop which is a set-reset memory circuit wherein an input pulse at terminal 5 constitutes a set pulse while an input pulse at terminal 6 constitutes a reset pulse. Because the set and reset pulses are differentiated with different time constants, as aforesaid, the set pulse will override the reset pulse when the two are applied together at the beginning of a multivibrator interval. The output of this flip-flop is from NOR gate d to terminal 3, and this output is connected through conductor 56 to the input terminal 12 of NOR gate b.

The output of NOR gate b at terminal 13 is sent over conductor 58 to the base of transistor Q2 which will conduct to turn on the lamp L when the signal at terminal 13 and on conductor 58 is at state 1. A feedback from the collector of transis-tor Q2 on conductor 60 to input terminal 11 of NOR gate b serves, in cooperation with NOR gate b, to latch Q2 off or on, as the case may be.

Since transistor Q2 drives transistor Q3 the alarm 38 (buzzer, bell, etc.) is turned on at the same time the lamp L is turned on. Likewise, when Q2 is turned off, the lamp L and alarm 38 will be turned off. In some embodiments of the invention it is not necessary to have both the lamp L and alarm 38. In fact, the invention encompasses the use of any signalling or indicating device that is actuated under control of transistor Q2 or other switching device.

If the shaft 24 is rotating in a fast condition, the input pulses 60 (FIG. 3) on conductors 34, 36 are sent out faster than the preselected multivibrator interval as represented by the width of the pulse 46 on the collector of transistor Q1. If the lamp L and alarm 38 had previously been on, then transistor Q2 would be on. This is due to the fact that the inputs at terminals 11, 12 to NOR gate b would both be at state 0 causing the output of that gate at terminal 13 and conductor 58 to be at state 1. The reset pulse 54a (FIG. 3) that follows the turn-on of the multivibrator is applied from conductor 52 to terminal 6. This causes terminal 3 to go to state 1 (see wave form 62, FIG. 3) and put a state 1 on conductor 56 and at input terminal 12. When an input state 1 is thus supplied to terminal 12, the output at terminal 13 (see wave form 64, FIG. 3) and on conductor 58 will go to state 0 and shut off transistor Q2, thereby turning off the lamp L and alarm 38. When Q2 turns off, the signal on conductor 60 goes from state 0 to state 1 to provide a holding signal to latch Q2 off because the signal on terminal 13 and conductor 58 cannot go to state 1 so long as there is a state 1 on conductor 60.

Q2 will not turn on to trigger the signalling devices so long as subsequent input pulses on conductors 34, 36 have an interval which is less than the interval of the multivibrator. This condition results because of the reset pulse 54a on terminal 6, which occurs before the end of the multivibrator interval. The reset pulse 54a changes the state of terminal 12 to a state 1. At this time terminals 11 and 12 are both at state 1 so terminal 13 stays at state 0. At the end of the multivibrator interval, Q1 again conducts dropping its collector and conductor 42 to a state 0. Diode D1 is shown connected from terminal 11 to the Q1 collector via conductor 42. The voltage drop on conductor 42 due to the Q1 turn-on causes diode D1 to conduct, thereby dropping the voltage at terminal 11 to a state 0. However, terminal 13 still remains at state 0 due to reset pulse 54a that was applied before the end of the multivibrator interval.

If the shaft 24 now slows down below the desired speed in accordance with the setting of potentiometer P, the conditions of the various wave forms will appear as shown in FIG. 4. There it should be noted that the input pulses 60s have an interval which is greater than the multivibrator interval as represented by the Q1 collector wave form 46. The second pulses 50b, 54b, as shown in FIG. 4, arrive after completion of the multivibrator interval. As previously described, the width of pulse 50 is greater than that of pulse 54 since the input signal to terminal 5 was differentiated with a substantially longer time constant than was the signal 54. Consequently, the same is true with respect to the signals 50b, 54b. As a result, the set pulse 50b on conductor 48 and terminal 5 overrides or cancels out the effect of the reset pulse 54b on conductor 52 and terminal 6. This keeps the flip-flop in a set condition whereby the output on conductor 56 is maintained at a state 0. This output is, of course, delivered as state 0 to input terminal 12 of NOR gate b. However, the output of NOR gate b will not change state unless the input at terminal 11 is also changed to state 0. This change of state at terminal 11 is effected by the turning on of Q1 at the end of the multivibrator interval, it being remembered that in the slow condition no reset pulse will be applied to terminal 6 before the end of the multivibrator interval. With Q1 now on, the voltage on Q1 collector and on conductor 42 will drop and cause a conduction through diode D1 to drop the signal level at terminal 11 to a state 0. Now, both terminals 11 and 12 are at state 0 causing NOR gate b to have an output on conductor 58 at state 1 to turn on transistor Q2. Subsequent set signals applied to input terminal 5 continue to cancel out the reset signals. Thus, with state 0 on conductor 60 and terminal 11 and also on terminal 12, transistor Q2 is maintained on to actuate continuously the signalling devices L and 38 until a fast condition is restored. The signals 62s, 64s for terminals 3 and 13 are seen to be at states 0 and 1 respectively in FIG. 4 after turn-on of Q2.

While the potentiometer P may be used to adjust the time interval of the multivibrator to correspond with the alarm point, it may be desired to have a "deadband" or percentage speed change between the turn-on point (fast to slow) and turn-off point (slow to fast). Thus, when the shaft is speeding up from a slow condition the lamp and alarm will turn off when one speed is reached. However, when the shaft is going from a fast to a slow condition, the lamp and alarm will turn on at another and lower speed. The use of the "dead-band" avoids the necessity of critical set-speed settings of the potentiometer P. It also insures that when the equipment begins operating that shaft has initially gone to a speed that is safely above the minimum desired speed. Provision of the dead-band may be made by the use of resistor R9 which supplies a portion of the signal from conductor 60 to the multivibrator to lengthen the multivibrator time interval when the lamp is off relative to the time interval when the lamp is on. The effect of R9 in the circuit is, therefore, to start the voltage drop on capacitor C3 at a higher voltage than if R9 were not present so that it takes a greater time for Q1 to turn on after being turned off whereby the multivibrator interval is increased for the lamp-off condition.

The invention is claimed as follows:

1. In a machine having a shaft, an alarm for indicating that said shaft is moving at less than at a preselected speed, said alarm comprising means for generating input pulses at a frequency proportional to the speed of the shaft, means for generating a reference signal of predetermined duration relative to said preselected speed, signalling means having a normal and a signalling condition, means comparing the reference signal duration with the input signal interval for actuating said signalling means to give a signalling condition only when the input pulse interval is greater than the duration of said reference signal, said last-named means comprising a set-reset memory circuit that produces an output signal at one binary logic state when set and an output signal at the complement binary logic state when reset, a gating circuit having an output determined by an input and the output signal of said memory circuit, the output state of said gating circuit determining the condition of said signalling means, and means for providing a set input to said memory circuit at the end of said predetermined duration of the reference signal.

2. In a machine according to claim 1, said means for generating a reference signal comprising a monostable multivibrator that is triggered by an input pulse.

3. In a machine according to claim 1, said means for actuating said signalling means further comprising set-reset latch circuitry for latching said signalling means in the condition to which the signalling means is driven, said latch circuitry including said gating circuit.

4. In a machine according to claim 1, said machine being a combine and said shaft being a power driven shaft thereon.

5. An alarm for indicating that the output of a function is less than at a preselected amount, said alarm comprising means for generating input pulses at a frequency proportional to the analog function, a monostable multivibrator for generating a reference signal of predetermined duration relative to said preselected magnitude of said analog function, said multivibrator being triggered by an input pulse, signalling means, and means for actuating said signalling means to produce a signalling condition when the input pulse interval is greater than the duration of said reference signal; said last-named means comprising a set-reset memory circuit having an output at one binary logic state when set and an output at the complement binary logic state when reset, means responsive to the input pulse following the pulse that triggers the multivibrator for providing a reset pulse for said memory circuit, and means comprising an input to said memory circuit from the output of said multivibrator for providing a set pulse for said memory circuit at the end of the multivibrator interval that cancels the effect of said reset pulse when the input pulse frequency is less than the duration of said reference signal.

6. An alarm according to claim 5 in which the set pulse is derived by a differentiation of the reference signal and the reset pulse is derived by a differentiation of the input pulses, the reset pulse having a shorter time constant than that of the set pulse.

7. An alarm according to claim 5 including adjusting means for varying the duration of said reference signal.

8. An alarm according to claim 5 including a set-reset latch circuit forming part of said actuating means for latching said signalling means in a signalling condition or in non-signalling condition when driven thereto; said latch circuit including a transistor that constitutes a switch for said signalling means, and a logic gate, the transistor having a collector connected to an input of the logic gate and the logic gate having an output connected to the base of the transistor.

9. An alarm according to claim 5 including means for increasing the duration of the reference signal when the signalling device is on compared to the duration of said reference signal when the signalling device is off.

10. Circuitry having signalling means and means for actuating the signalling means, said actuating means including a flip-flop having set and reset inputs and an output, said output being at one binary logic state when triggered by a pulse at the set input and being at the complement state when triggered by a pulse at the reset input, means for generating input pulses to said reset input, and circuit means including a monostable multivibrator triggered by a signal at the reset input, said multivibrator producing an output signal of predetermined duration, said circuit means applying set pulses to said set input through the output of said multivibrator, the reset pulses preventing setting of said flip-flop if received from said generating means at intervals greater than the duration of said multivibrator signal, said set pulse being of such magnitude and duration as to cancel the effect of a reset pulse if an input pulse is received at said reset input after the duration of said multivibrator signal.

\* \* \* \* \*